United States Patent
Solazzo

(10) Patent No.: US 10,710,450 B2
(45) Date of Patent: Jul. 14, 2020

(54) AIR FLAP ARRANGEMENT HAVING A POSITION SENSING SYSTEM FOR A MOTOR VEHICLE

(71) Applicant: Röchling Automotive SE & Co. KG, Mannheim (DE)

(72) Inventor: Domenico Solazzo, Worms (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 612 days.

(21) Appl. No.: 14/691,929

(22) Filed: Apr. 21, 2015

(65) Prior Publication Data

US 2015/0298539 A1    Oct. 22, 2015

(30) Foreign Application Priority Data

Apr. 22, 2014    (DE) .................. 10 2014 207 566

(51) Int. Cl.
    *B60K 11/08*    (2006.01)
(52) U.S. Cl.
    CPC ............. *B60K 11/085* (2013.01); *Y02T 10/88* (2013.01)
(58) Field of Classification Search
    CPC ..................................................... B60K 11/085
    USPC ......................................................... 454/143
    See application file for complete search history.

(56) References Cited

U.S. PATENT DOCUMENTS

| | | | |
|---|---|---|---|
| 6,225,898 B1 | 5/2001 | Kamiya et al. | |
| 7,938,105 B2 | 5/2011 | Gates et al. | |
| 8,561,738 B2 | 10/2013 | Charnesky et al. | |
| 8,692,662 B2 | 4/2014 | Shin et al. | |
| 8,739,744 B2 | 6/2014 | Charnesky et al. | |
| 2005/0284522 A1* | 12/2005 | Palle .................... | G01D 11/245 137/554 |
| 2007/0079806 A1 | 4/2007 | Alberghini et al. | |

(Continued)

FOREIGN PATENT DOCUMENTS

| | | |
|---|---|---|
| CN | 1891996 | 1/2007 |
| CN | 1897996 | 1/2007 |

(Continued)

OTHER PUBLICATIONS

German Search Report issued for German patent application No. 10 2014 207 566.1 dated Oct. 1, 2014, along with machine English translation (14 pages).

(Continued)

*Primary Examiner* — Steven B McAllister
*Assistant Examiner* — Allen R Schult

(57) ABSTRACT

An air flap arrangement for a motor vehicle comprises a housing having an air passage opening, at least two air flaps movably mounted on the housing, and a force- and motion-transmitting motion drive coupled to the air flaps. The air flaps are coupled by a transmission and/or linkage for mutual movement. The air flaps are movable between a closed position, in which the cross-sectional area of the air passage opening through which air can flow is reduced, and a passage position, which is different from the closed position, in which the cross-sectional area of the air passage opening through which air can flow is greater than in the closed position. At least one sensor is associated with each air flap of a plurality of air flaps, such that the position of the air flaps can be detected by the sensor.

12 Claims, 1 Drawing Sheet

(56) References Cited

U.S. PATENT DOCUMENTS

| | | | |
|---|---|---|---|
| 2008/0130204 A1* | 6/2008 | Bielesch | H01R 31/06 361/807 |
| 2008/0245585 A1 | 10/2008 | Bielesch | |
| 2011/0120768 A1 | 5/2011 | Kremer et al. | |
| 2013/0084179 A1* | 4/2013 | Mantese | F01D 17/162 416/1 |
| 2013/0170981 A1* | 7/2013 | Lang | F03D 7/047 416/1 |
| 2013/0247862 A1 | 9/2013 | Sakai | |
| 2014/0038508 A1 | 2/2014 | Solazzo | |
| 2014/0045418 A1 | 2/2014 | Schneider | |
| 2015/0149043 A1* | 5/2015 | Macfarlane | F01P 7/12 701/49 |

FOREIGN PATENT DOCUMENTS

| | | | |
|---|---|---|---|
| CN | 1944986 | 4/2007 | |
| CN | 102037222 | 4/2011 | |
| CN | 103249585 | 8/2013 | |
| DE | 43 27 537 A1 | 2/1995 | |
| DE | 4327537 A1 * | 2/1995 | G05B 19/0423 |
| DE | 10 2004 028 393 A1 | 12/2005 | |
| DE | 10 2004 030 698 A1 | 1/2006 | |
| DE | 10 2005 048 451 A1 | 4/2006 | |
| DE | 10 2008 049 876 A1 | 4/2010 | |
| DE | 10 2010 002 373 | 9/2011 | |
| DE | 10 2011 111 265 A1 | 5/2012 | |
| DE | 10 2011 119 368 A1 | 5/2012 | |
| DE | 101 55 647 B4 | 7/2012 | |
| DE | 10 2011 067 120 A1 | 5/2013 | |
| DE | 10 2012 106 058 A1 | 6/2013 | |
| EP | 1 606 503 B1 | 11/2008 | |
| GB | 1538870 | 1/1979 | |

OTHER PUBLICATIONS

Chinese Office Action issued in CN201510182202.7 dated Feb. 27, 2018.

* cited by examiner

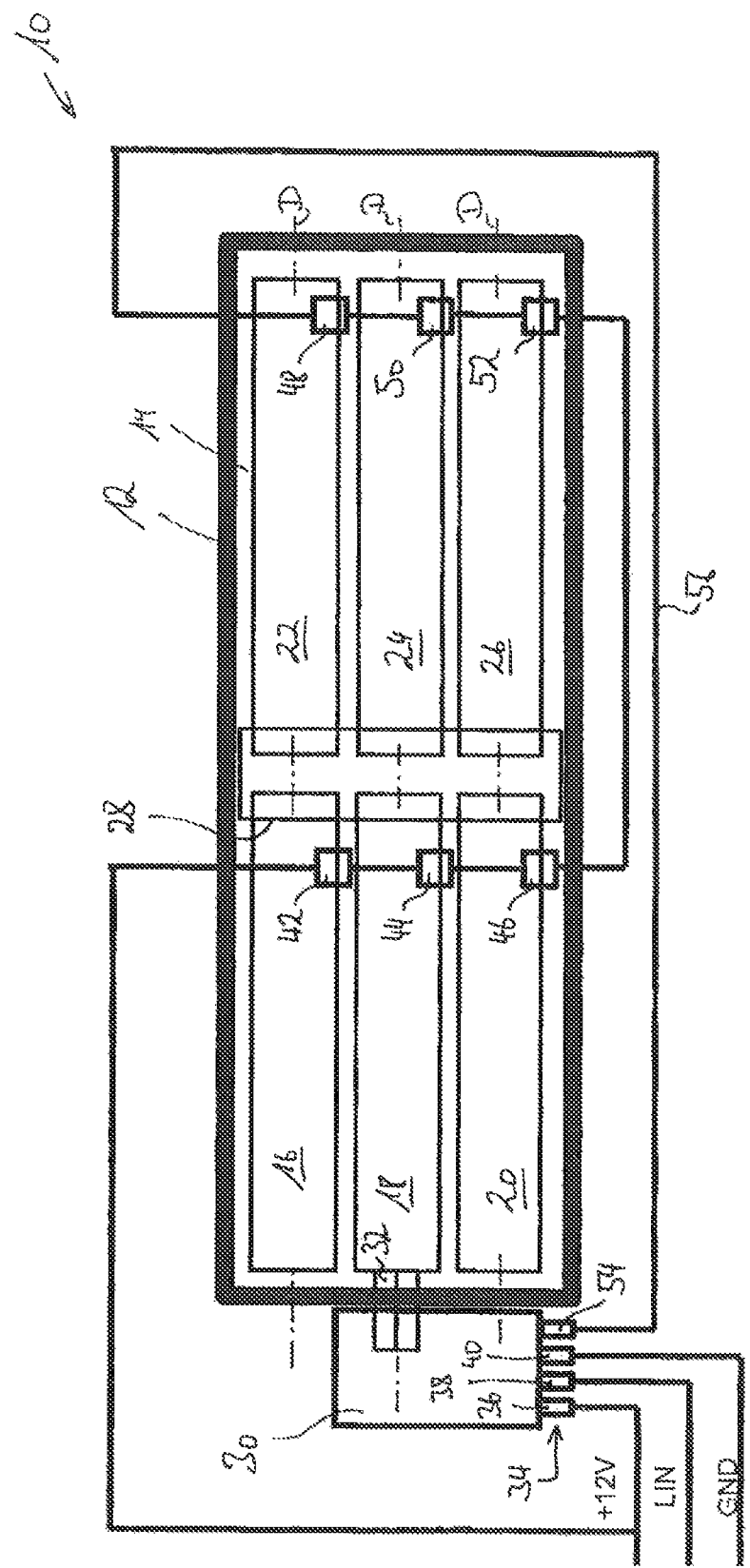

AIR FLAP ARRANGEMENT HAVING A POSITION SENSING SYSTEM FOR A MOTOR VEHICLE

CROSS REFERENCE TO RELATED APPLICATIONS

This application claims priority to German Application No. 10 2014 207 566.1, filed Apr. 22, 2014, the entirety of the disclosure of which is hereby incorporated herein by reference.

BACKGROUND OF THE INVENTION

1. Field of the Invention

The present invention relates to an air flap arrangement for a motor vehicle comprising a housing having an air passage opening, at least two air flaps movably mounted on the housing and a force- and motion-transmitting motion drive coupled to the air flaps, wherein the at least two air flaps are coupled by a transmission and/or linkage for mutual movement, and wherein the at least two air flaps are movable between a closed position, in which closed position the cross-sectional area of the air passage opening through which air can flow is reduced, and a passage position, which is different from the closed position, and in which passage position the cross-sectional area of the air passage opening through which air can flow is greater than in the closed position.

2. Background of the Related Art

Such air flap arrangements are generally known in the automotive industry. They are generally used in motor vehicles to supply the engine compartment positioned behind the air flap arrangement in the direction of flow of the air passage opening with cooling air for convection cooling as needed.

Air flap arrangements are relevant to emissions, since reducing the size of or closing the air passage opening upon a cold start can withdraw the cooling air from the internal combustion engine and, if desired, from its surrounding assemblies, which can result in a faster warm-up of the internal combustion engine to the nominal operating temperature with accordingly optimal combustion. Thus, the use of the above-described air flap arrangements can shorten cold-start phases with disadvantageously high levels of pollutant emission.

The closed position can advantageously be a position in which the air passage opening is completely blocked for the passage of air. This then means that the cross-sectional area of the air passage opening is reduced to zero. The cross-sectional area should always be orthogonal to the direction of flow, which can vary depending on the relative position of the air flaps with respect to the housing.

The through-flow cross-sectional area of the air passage opening is preferentially at a maximum in the passage position.

To simplify the construction of the known air flap arrangement, the motion drive is usually directly coupled in a force- and motion-transmitting manner to one of the air flaps or to a drive and/or linkage part and is directly coupled via the designated transmission and/or linkage to the other air flap, such that all air flaps coupled by the transmission and/or linkage for mutual movement are synchronously drivable for the relative movement by the motion drive relative to the housing movably supporting them. As a rule, preferably all of the at least two air flaps therefore have the same relative position relative to the housing movably supporting them at any time.

Owing to the provided motion coupling of the air flaps for mutual movement with each other, only the actuator is frequently checked for functionality, for instance by the on-board computer of a motor vehicle carrying the air flap arrangement. If the actuator in the off-board information network of a motor vehicle is recognized as functional, then the whole air flap arrangement is assumed to be functional because of the customarily robust construction of the air flap arrangement.

This conclusion can, however, possibly be misleading if, for example, a part of the motion coupling—that is to say of the transmission and/or of the linkage—of the air flaps is broken or if, for example, the direct coupling of the motion drive is defective with regard to one air flap or one transmission and/or linkage part.

Numerous diagnostic processes in motor vehicles are known in the prior art, mostly designated with the acronym "OBD" (onboard diagnosis). On-board diagnosis is of increasing importance precisely for emissions-relevant components of motor vehicles. In this connection, DE 101 55 647 B4 discloses an on-board diagnostic process having weighted classes of a classification memory in order to realize a condition statement about a component to be checked that is as accurate as possible.

The OBD processes and devices, however, generally relate to the operation of the internal combustion engine and to the exhaust emission quality (see, for example, U.S. Pat. No. 6,225,898 B1 or U.S. Pat. No. 7,938,105 B2 or EP 1 606 503 B1).

SUMMARY OF THE INVENTION

The object of the present invention is to further develop the previously mentioned air flap arrangement for a motor vehicle such that the air flap arrangement for a motor vehicle allows to functionally monitor itself as a component.

This object is inventively achieved by a generic air flap arrangement for a motor vehicle, which air flap arrangement has a plurality of sensors, wherein each air flap of a plurality of air flaps mounted on the housing, preferentially all air flaps, is associated with at least one sensor such that at least one position can be detected by the sensor from the closed position and passage position of the air flaps.

Owing to the plurality of sensors, it is possible for each sensor to detect at least one position of an air flap from the closed position and passage position, such that at least one position for a plurality of air flaps, preferentially for all the air flaps of the air flap arrangement, can be detected and accordingly a correct operation of the air flap arrangement in this position. It is thus possible to dispense with merely inferring the correct position of each air flap from a detected correct operation of the motion drive by solely assuming the proper functionality of the transmission and/or linkage. The position of only one air flap need not be checked to deduce the position of other air flaps, but rather each air flap of interest can have an associated sensor for monitoring the at least one position from the closed position and the passage position. It can thus also be determined that only one single air flap or a few specific air flaps does/do not function properly while other air flaps possibly do operate properly.

If the sensor associated with an air flap can in fact detect only one position of the air flap, then this position that can be detected is preferentially the passage position. Because, if it is possible to detect at least that one air flap is indeed in the passage position, sufficient cooling of the assemblies located in the direction of flow behind the air flap, in particular of the internal combustion engine, is ensured.

Each sensor associated with an air flap can advantageously monitor both stated positions of the air flap, especially advantageously even any intermediate position between the passage position the closed position.

The sensor can be formed by a simple contact that can differentiate between "open" and "closed" only, wherein one of the two states is associated with the at least one position that can be detected. The one sensor state then leads to a high-level output signal and the other sensor state leads to a low-level output signal.

A separate sensor can also be associated with each air flap of the plurality of air flaps of the air flap arrangement for the detection of each position such that the number of sensors associated with an air flap corresponds to the number of positions that can be detected on the air flap. In turn, each of the sensors associated with an air flap can be formed by a simple contact. A sensor delivering a continuous signal, which signal is dependent on the relative position of the flap relative to the housing, is, however, also conceivable, for example in the form of a potentiometer or the like.

Furthermore, according to one further development of the present invention, it is conceivable to consider that the air flap itself is part of the sensor, for example by configuring at least one section of the air flap as electrically conductive, and a switch or contact formed including the electrically conductive part has a different state, such as "open" or "closed", in the detectable relative position of the air flap relative to the housing than when the air flap is not in the detectable relative position.

Generally, the motion drives of assemblies in a motor vehicle have a four-pole plug or a four-pole socket. As a rule, one pole is connected to a power source, in particular to the battery of the motor vehicle, another pole is connected to the vehicle mass, and a third pole is connected to a data transmission bus system. A fourth pole of a four-pole plug is usually not used. It is therefore advantageous for an easy use of the sensor signal without involving a complex assembly, if the motion drive includes a four-pole plug or a four-pole socket, wherein one pole of the motion-drive plug or of the motion-drive socket is connected as a sensor pole to a plurality of sensors in a signal-transmitting manner.

The motion drive can be connected to a separate control device, for example via the above-mentioned data transmission bus system, which control device controls the motion drive. Alternatively, the motion drive can also have an integrated control device. In order to directly process sensor signals from the plurality of sensors it can be provided that a control device connected to the motion drive for its control has a four-pole plug or a four-pole socket, wherein one pole of the control device plug or of the control device socket is connected as a sensor pole to the plurality of sensors in a signal-transmitting manner. The control device customarily has a processing unit (CPU), with which processing unit it is possible to process the sensor signals. In the last-mentioned instance of a direct signal-transmitting connection of the plurality of sensors to the control device, the plurality of sensors can be indirectly connected to the motion drive by the control device.

A data transmission bus system represents a simple and very flexible possibility of signal transmission in a vehicle. Therefore it is preferred, if a further pole of the plug or socket, which further pole is different from the sensor pole, is connected to a data transmission bus system, for example a CAN bus system, a LIN bus system, a SENT bus system and the like.

In principle, it can be sufficient if the plurality of sensors for the transmission of the signals via the data transmission bus system is configured on an actuator of the motion drive and/or on the control device and/or on an on-board computer of the vehicle that has the air flap arrangement. A sensor signal on the actuator of the motion drive can thereby directly or indirectly bring about its operation for the relative adjustment of the air flap coupled to the respective sensor or, by further processing a sensor signal on the control device, can cause a warning signal output to the vehicle driver in addition to the direct activation of a relative adjustment. The same applies to the connection of the plurality of sensors to the on-board computer.

The signal transmission of the plurality of sensors with one or more of the specified devices is preferably a bidirectional signal transmission by means of which bidirectional signal transmission, for example, a diagnostic function of the plurality of sensors can be realized such that the functionality of the sensors can be queried by the device coupled to them. At least one part of the plurality of sensors, or even all of the sensors, can be connected to each other in series. One part of the plurality of sensors can likewise be connected to one another in parallel. On the other hand, all of the sensors can be connected to one another in parallel.

As already indicated above, correspondingly further developed sensors, such as potentiometers or similar electrical components can be configured for that purpose, at least in a section of the relative range of movement of the air flaps with which they are associated, to detect the relative position of the air flap relative to the housing. It can hereby be possible to inform the vehicle driver about the current relative position of the air flaps in the vehicle interior. For obvious reasons, the sensors are preferably configured to detect the relative position of the air flaps in their entire relative range of movement. The relative position of the air flaps with respect to the housing can be detected in the section of the relative range of movement or in the entire relative range of movement thereof in a continuous or gradually staged manner.

BRIEF DESCRIPTION OF THE DRAWING FIGURES

The present invention will be explained in more detail below with reference to the attached drawing.

FIG. 1 shows a roughly schematic top view of an inventive embodiment of the presently discussed air flap arrangement for a motor vehicle.

DETAILED DESCRIPTION OF THE PREFERRED EMBODIMENTS

In FIG. 1, an air flap arrangement of a motor vehicle of the present invention is generally designated with 10. This air flap arrangement comprises a housing 12 with a rectangular air passage opening 14, in which air passage opening 14, for example, six air flaps 16, 18, 20, 22, 24, and 26 are pivotably mounted about parallel axes of rotation D relative to the housing 12.

The air flaps 16 to 26 are coupled to one another by a merely roughly schematically indicated coupling of motion 28 for the mutual pivotal movement about the respective axes of rotation D. The coupling device 28 can, for example, be an articulated connecting bridge hinged to actuating arms of the air flaps 16 to 26.

The air flaps 16 to 26 are represented in their closed position in the drawing, in which closed position the air flaps close the air passage opening 14, or reduce the cross-section of the air passage opening to a minimum. In the position shown in the drawing, the direction of inflow of the air passage opening 14 is orthogonal to the plane of the drawing of the FIGURE.

By mutually pivoting the air flaps 16 to 26, the cross-sectional area of the air passage opening 14 through which air can flow can be enlarged from the closed position shown in the drawing until a maximum cross-sectional area is reached. This can be the case, for example, if the air flaps 16 to 26 shown in the drawing are rotated approximately 90° from the position shown in the drawing about the respective axes of rotation D.

A motion drive 30 is provided for the relative adjustment of the air flaps 16 to 26 relative to the housing 12, which motion drive 30 can be directly connected to the air flap 18 in a force- and motion-transmitting manner via a drive shaft 32. In the shown example, the air flap 18 is therefore a directly driven air flap, while the air flaps 16, 20, 22, 24, and 26 are indirectly coupled to the motion drive 30 via the air flap 18 and the coupling device 28.

The motion drive has a four-pole socket 34, of which four-pole socket 34 a first pole 36 can be directly coupled to a vehicle battery, a second pole 38 can be connected to a data transmission bus system, and a third pole 40 can be coupled to the vehicle mass. Each air flap 16 to 26 is associated with a respective sensor 42 to 52, which sensors 42 to 52 are configured to detect the closed position of the air flaps 16 to 26 in the shown example. When, for example, an air flap 16 to 26 is in its closed position, a contact can be closed on an associated sensor 42 to 52, which contact is not closed when the air flap is not in the turning position.

In the shown example, the sensors 42 to 52 are connected to each other in series and in this series connection they are connected to a fourth pole 54 of the four-pole socket 34. Due to a data processing unit provided in the motion drive 30, information from the sensor connection cable 56, via which cable 56 the sensors 42 to 52 are connected to the pole 54 in a signal-transmitting manner, can thus be fed into the data transmission bus system, and is then available to one or more control devices and/or to an on-board computer of the vehicle. The signal transmission via sensors 42 to 52 is preferentially bidirectional such that a control device and/or the on-board computer of the vehicle can actively retrieve information from the sensors 42 to 52, such as information about the functionality of the individual sensors.

For this purpose, the sensors 42 to 52 can also be provided with a data address via which signals of the on-board computer can be addressed to an individual sensor of the plurality of sensors 42 to 52.

Sensors 42 to 52 can preferably also be used that not only can detect the closed position or a passage position of the air flaps 16 to 26, but which can also detect any intermediate position of the air flaps 16 to 26 between their respective passage position and closed position in a continuous or gradually staged manner.

The sensors 42 to 52 of the air flap arrangement are preferably connected to the motion drive of the air flap arrangement 10 such that the air flap arrangement can be provided as a functional, pre-assembled unit and installed in a vehicle.

The invention claimed is:

1. An air flap arrangement for a motor vehicle comprising:
a housing having an air passage opening,
at least two air flaps movably mounted on the housing, and
a force- and motion-transmitting motion drive coupled to the at least two air flaps,
wherein the at least two air flaps are coupled by at least one of a transmission and linkage for mutual movement, and wherein the at least two air flaps are movable between a closed position, and a passage position, which is different from the closed position, in which passage position the cross-sectional area of the air passage opening through which air can flow is greater than the closed position,
wherein the air flap arrangement has a plurality of sensors, wherein at least a first sensor of the plurality of sensors is associated with a first air flap of the at least two air flaps mounted on the housing, and a second sensor of the plurality of sensors is associated with a second air flap of the at least two air flaps, such that one position out of the closed position and passage position of the first and second air flaps is a detectable position and can be detected by the respectively associated first and second sensor, while the respective other position cannot be detected by the first and second sensor,
wherein the first and second sensors are formed by a first switch and a second switch respectively, said switches being in an operational state of closed when the air flap associated with the respective switch is in the detectable position, and being in an operational state of open when the air flap associated with the respective switch is not in the detectable position,
wherein the first switch comprises at least one first section of the first air flap, and the second switch comprises at least one second section of the second air flap,
wherein the first and second sections are electrically conductive.

2. The air flap arrangement for a motor vehicle according to claim 1,
wherein the motion drive has a four-pole plug or a four-pole socket, wherein one pole of the motion-drive plug or of the motion-drive socket is connected as a sensor pole to the plurality of sensors in a signal transmitting manner.

3. An air flap arrangement for a motor vehicle according to claim 1,
wherein a control device, which is connected to the motion drive for controlling the motion drive, has a four-pole plug or a four-pole plug or a four-pole socket, wherein one pole of the control device plug or of the control device socket is connected as a sensor pole to the plurality of sensors in a signal-transmitting manner.

4. An air flap arrangement for a motor vehicle according to claim 2,
wherein an additional pole of the plug or of the socket, which additional pole is different from the sensor pole, is connected to a data transmission bus system.

5. The air flap arrangement for a motor vehicle according to claim 4,
wherein the plurality of sensors for the signal transmission via the data transmission bus system is configured on an actuator of the motion drive and/or on the control device and/or on an on-board computer of the vehicle that has the air flap arrangement with one or more of the stated devices.

6. An air flap arrangement for a motor vehicle according to claim 1, wherein at least one part of the plurality of sensors are connected to each other in series.

7. An air flap arrangement for a motor vehicle according to claim 1,
wherein at least one part of the plurality of sensors are connected to each other in parallel.

8. An air flap arrangement for a motor vehicle according to claim 1,
wherein at least one sensor of the plurality of sensors js associated with all said air flaps mounted on the housing, such that at least one position out of the closed position and passage position of the air flaps can be detected by the sensor.

9. The air flap arrangement for a motor vehicle according to claim 4,
wherein the plurality of sensors for the signal transmission via the data transmission bus system is configured on an actuator of the motion drive and/or on the control device and/or on an on-board computer of the vehicle that has the air flap arrangement, for bidirectional signal transmission, with one or more of the stated devices.

10. An air flap arrangement for a motor vehicle according claim 1,
wherein all sensors of said plurality of sensors are connected to each other in series.

11. An air flap arrangement for a motor vehicle according to claim 1,
wherein all sensors of said plurality of sensors are connected to each other in parallel.

12. The air flap arrangement according to claim 4,
wherein the data transmission bus system is a CAN bus system, a LIN bus system, or a SENT bus system.

* * * * *